United States Patent
Foulogne et al.

(10) Patent No.: US 12,054,994 B2
(45) Date of Patent: Aug. 6, 2024

(54) THREADED CONNECTION FOR CASING STRING OF AN OIL WELL

(71) Applicants: VALLOUREC OIL AND GAS FRANCE, Aulnoye-Aymeries (FR); NIPPON STEEL CORPORATION, Chiyoda-ku (JP)

(72) Inventors: Anthony Foulogne, Boulogne-Billancourt (FR); Pierre Martin, Boulogne-Billancourt (FR); Malic Abdeddaim, Boulogne-Billancourt (FR); Mickael Pusard, Boulogne-Billancourt (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 17 days.

(21) Appl. No.: 17/628,113

(22) PCT Filed: Jul. 15, 2020

(86) PCT No.: PCT/EP2020/069949
§ 371 (c)(1),
(2) Date: Jan. 18, 2022

(87) PCT Pub. No.: WO2021/013646
PCT Pub. Date: Jan. 28, 2021

(65) Prior Publication Data
US 2022/0259927 A1 Aug. 18, 2022

(30) Foreign Application Priority Data
Jul. 19, 2019 (FR) ...................................... 1908203

(51) Int. Cl.
*E21B 17/042* (2006.01)
*F16L 15/00* (2006.01)
*F16L 15/06* (2006.01)

(52) U.S. Cl.
CPC ........ *E21B 17/0423* (2013.01); *F16L 15/002* (2013.01); *F16L 15/06* (2013.01)

(58) Field of Classification Search
CPC .... E21B 17/0423; E21B 17/042; E21B 17/08; F16L 15/002; F16L 15/004; F16L 15/007
See application file for complete search history.

(56) References Cited

U.S. PATENT DOCUMENTS

| | | | | |
|---|---|---|---|---|
| 1,927,656 A | * | 9/1933 | Eaton | E21B 17/042 285/334 |
| 2,211,179 A | * | 8/1940 | Stone | F16L 15/007 285/334 |

(Continued)

FOREIGN PATENT DOCUMENTS

| | | |
|---|---|---|
| EP | 0 767 335 A1 | 4/1997 |
| EP | 3 159 591 A1 | 4/2017 |

(Continued)

OTHER PUBLICATIONS

International Search Report mailed on Sep. 18, 2020 in PCT/EP2020/069949 filed on Jul. 15, 2020, 3 pages.

*Primary Examiner* — Kipp C Wallace
(74) *Attorney, Agent, or Firm* — Oblon, McClelland, Maier & Neustadt, L.L.P.

(57) ABSTRACT

Threaded tubular connection for the casing of hydrocarbon wells obtained by makeup of a male tool joint with a female tool joint, the connection includes in order from a free edge of the male tool joint: an inner metal-metal seal, a first threaded portion, an intermediate abutment, an intermediate metal-metal seal and a second threaded portion, the free edge being at a non-zero axial distance from the female tool (Continued)

joint, the threaded portions each comprising a helix equipped with a load flank, a thread crest, a stabbing flank, a thread root, such that a pitch of the load flank and a pitch of the stabbing flank of the first threaded portion, and respectively a pitch of the load flank and a pitch of the stabbing flank of the second threaded portion fulfil the following condition: $SFLb1=LFLb1=SFLb2=LFLb2=SFLp1=SLFLp2=LFLp2$.

15 Claims, 6 Drawing Sheets

(56) References Cited

U.S. PATENT DOCUMENTS

| | | | | |
|---|---|---|---|---|
| 4,253,687 | A * | 3/1981 | Maples | F16L 15/007 285/332.3 |
| 5,687,999 | A | 11/1997 | Lancry et al. | |
| 6,050,610 | A * | 4/2000 | Enderle | F16L 15/001 285/94 |
| 6,056,324 | A * | 5/2000 | Reimert | E21B 19/16 29/446 |
| 6,206,436 | B1 * | 3/2001 | Mallis | E21B 17/042 285/390 |
| 6,322,110 | B1 * | 11/2001 | Banker | E21B 17/0423 285/333 |
| 6,705,648 | B1 | 3/2004 | Maruyama et al. | |
| 6,752,436 | B1 * | 6/2004 | Verdillon | F16L 15/00 285/333 |
| 8,029,025 | B1 * | 10/2011 | Sivley, IV | E21B 17/0423 285/333 |
| 10,774,598 | B2 | 9/2020 | Inose et al. | |
| 11,466,800 | B2 * | 10/2022 | Williamson | B21C 37/28 |
| 2004/0084901 | A1 * | 5/2004 | Church | F16L 15/04 285/333 |
| 2005/0189147 | A1 * | 9/2005 | Williamson | E21B 17/042 175/320 |
| 2010/0078936 | A1 * | 4/2010 | Nakamura | F16L 15/06 285/334 |
| 2011/0133449 | A1 * | 6/2011 | Mazzaferro | E21B 17/042 285/333 |
| 2016/0115742 | A1 * | 4/2016 | Martin | E21B 17/0423 285/391 |
| 2017/0101830 | A1 * | 4/2017 | Inose | F16L 15/002 |
| 2018/0080287 | A1 * | 3/2018 | Yoshikawa | E21B 17/042 |
| 2018/0283109 | A1 | 10/2018 | Martin | |
| 2019/0032820 | A1 * | 1/2019 | Inose | F16L 15/06 |
| 2019/0040978 | A1 * | 2/2019 | Oku | F16L 15/04 |

FOREIGN PATENT DOCUMENTS

| | | |
|---|---|---|
| EP | 3 572 613 A1 | 11/2019 |
| WO | WO 2016/097049 A1 | 6/2016 |
| WO | WO 2019/093163 A1 | 5/2019 |

* cited by examiner

THREADED CONNECTION FOR CASING STRING OF AN OIL WELL

The present invention relates to connections or assemblies of tubes intended to be connected by means of threadings and relates to the tubes used in industry and in particular threaded assemblies or junctions intended to equip tubing strings or production tubing accessories or casing strings for the exploration, prospecting or exploitation of oil or gas wells, as well as threaded assemblies or junctions used for any application in which it may be necessary to assemble pipelines or tubing accessories such as for example in the geothermal energy industry or in steam production. The threaded assembly according to the invention is particularly useful for the assembly of metal tubes used for the casing of oil or gas wells as explained hereinafter.

In this text, the words "assembly" or "connection" or "junction" or "joint" are used with the same meaning, except for particular contexts. By "tubes" is meant any type of tubes or tubular components or tubing accessories existing or suitable for utilization in industry, these tubes in general being metal tubes. In particular, these tubes are seamless tubes obtained from steel such as those defined in API Specification 5 CT, or also according to the Standard ISO 11960:2004. Preferably, a connection according to the invention is obtained between tubes produced from a material having a high-capacity breaking strength, for example steels of a grade comprised between 862 and 965 MPa (i.e. 125 and 140 ksi).

Numerous types of assembly for oil or gas tubes are known which give satisfactory results from the point of view of mechanical characteristics and sealing, even under harsh conditions of use. Some of these assemblies require tubes, equipped with male frustoconical threadings at the two ends which are assembled by means of couplings having two corresponding female frustoconical threadings. This mode of assembly has the advantage of making the two components of the assembly rigid, due to the existence of positive interferences that can be created between male threading and female threading. These are threaded and coupled connections, also called T&C connections.

However, the outer diameter of these couplings is greater than that of the corresponding tubes and, when these assemblies are used in casing tubes, requires the production of boreholes of increased diameter. In the case of very deep wells, of a depth exceeding 4000 m, the casing will need to descend deeper into the well, and it is known that assemblies without a coupling are preferred, as taught in documents U.S. Pat. No. 2,992,019, EP 0767335 or also US 2013/0015657. In this case, the tubes each comprise an end equipped with a male tool joint and a second end equipped with a female tool joint. The tubes are assembled end-to-end by connections between male and female tool joints. These assemblies are denoted by the term "integral".

In order to respond to increased needs for resistance to internal and external pressures, an integral connection is known from document U.S. Pat. No. 4,662,659 equipped with two staggered threaded portions on either side of an intermediate abutment, this intermediate abutment being designed with a negative angle in order to increase the resistance to pressures. In addition, on one side of this intermediate abutment, or on either side of this intermediate abutment, the document teaches sealing zones by radial interference between conical surfaces, the taper angles of which are slightly modified with respect to one another by an angle γ. According to this document, the seal is provided exclusively centrally, between the two threaded portions, in proximity to the intermediate abutment. Document US 2019 0040978 proposes an alternative to document U.S. Pat. No. 4,662,659, by specifying a particular geometry of these seals on either side of the intermediate abutment, and by modifying the shape of the threading and by choosing a threading having a dovetail profile.

Moreover, another connection is known from document US 2017 0101830, equipped with two staggered threaded portions on either side of an intermediate abutment. According to this document, a seal is provided between a threaded portion and this intermediate abutment. Now, the definition of this seal reduces the performance and the capacity of the intermediate abutment, so this document teaches providing an additional abutment surface at the level of the distal end of the male tool joint. Alternatively, other documents propose modifying the threading in order to compensate for the lower performance of the intermediate abutment under compression. These alternative threadings are thus called "dovetail" threadings and are made up in such a way as to obtain a locking together of the threaded portions. To this end, the threaded portions are proposed with a pitch value that is different for the load flank and for the stabbing flank, so that the helix of this threading proposes a tooth width which increases progressively with the turns of the helix, from one end to the other, the hollows defined between the spires of this helix reducing according to the same progression. Thus, the makeup of the threaded portions is carried out until contact is obtained between stabbing flanks, but also between load flanks. While this type of connection, called "self-locking wedge thread", is very effective, it is, however, very difficult to machine and to master at the moment of assembly.

Despite the various solutions that are already known, a need has therefore arisen to facilitate the machining of an integral connection which is suited to forming casings for very deep wells, the performance with respect to resistance to the cycles of internal pressures and external pressures, as well as the tolerances under traction and compression, are nevertheless achieved, while accepting the inherent machining and assembly tolerances in the field of oil or gas tubes. In practice, it has also become apparent that the manner in which the assembly grease was applied on the joints was a factor of the first order in successfully making a connection. The threaded connection according to the invention makes it possible to better tolerate the handling variations at the moment of application of a quantity of grease.

The benefit of the invention is to propose an integral connection which responds to technical requirements close to those of sleeve couplings, and which makes it possible to have an effectiveness close to that of the tube. In particular, a connection according to the invention can have an effectiveness equal to 96% of the effectiveness of the tube. The effectiveness is in general defined as being the relationship between the critical section of the connection and the cross-section of a regular portion of a tube between the two ends of a component. The critical section of the connection is equal to the smallest critical section of the male tool joint or of the female tool joint.

The invention applies preferentially to threaded connections having a large diameter, in particular to tubes having an outer diameter greater than 177.8 mm (7 inches), preferentially greater than 254 mm (10 inches), for example 406.4 mm (16 inches).

The invention proposes a connection with better adhesion in these respects.

The subject of the invention is a threaded tubular connection for the drilling and/or exploitation of hydrocarbon wells, comprising a first tube equipped at a first distal end with a male tool joint and a second tube equipped at a second distal end with a female tool joint, the male tool joint being capable of being assembled by makeup with the female tool joint, the first tube assembled to the second tube together defining a longitudinal axis X, the male tool joint comprising in this order from a free edge of the first distal end towards a body of this first tube: a male inner sealing surface, a first male threaded portion, a male abutment shoulder, a male intermediate sealing surface, and a second male threaded portion, the female tool joint comprising a female inner sealing surface, intended to form an inner seal by radial interference with the first male sealing surface, a first female threaded portion engaged with the first male threaded portion, a female abutment shoulder in abutting contact with the male abutment shoulder, a female intermediate sealing surface intended to form an intermediate seal by radial interference with the male intermediate sealing surface, and a second female threaded portion engaged with the second male threaded portion, when the connection is assembled, the free edge of the first distal end being at a non-zero axial distance (d) from the female tool joint in the assembled position, the male threaded portions each comprising at least one helix equipped with a load flank, a thread crest, a stabbing flank, a thread root, such that a pitch of the load flank LFLp1 and a pitch of the stabbing flank SFLp1 of the first male threaded portion, and respectively a pitch of the load flank LFLp2 and a pitch of the stabbing flank SFLp2 of the second male threaded portion fulfil the following condition:

$$SFL_{p1}=LFL_{p1}=SFL_{p2}=LFL_{p2}=k1 \quad [\text{Math 1}]$$

Where k1 is a constant for at least two complete turns of each of the helices.

Preferably, the female threaded portions can each comprise at least one helix equipped with a load flank, a thread crest, a stabbing flank, a thread root, such that a pitch of the load flank LFLb1 and a pitch of the stabbing flank SFLb1 of the first male threaded portion, and respectively a pitch of the load flank LFLb2 and a pitch of the stabbing flank SFLb2 of the second male threaded portion fulfils the following condition:

$$SFL_{b1}=LFL_{b1}=SFL_{b2}=LFL_{b2}=k2 \quad [\text{Math 2}]$$

Where k2 is a constant for at least two complete turns of each of the helices.

Preferably, the constants k1 and k2 can be equal.

For example, the first female threaded portion can comprise an annular groove, this groove for example being able to have a radial width smaller than the constant k2, this groove being at a radial distance from the at least two complete turns of the helix of the first female threaded portion defined above.

Preferably, the helix of the first female threaded portion can be frustoconical, or even exclusively frustoconical, for example having a taper comprised between 5% and 15%, preferentially 8% and 12%. In this case, the helix of the first male threaded portion can comprise a frustoconical part having a taper identical to that of the helix of the first female threaded portion, and a cylindrical part in proximity to the inner sealing surface.

Advantageously, the helix of the second female threaded portion can be frustoconical, preferably exclusively frustoconical, for example having a taper comprised between 5% and 15%, preferentially 8% to 12%. In this case also, the helix of the second male threaded portion can comprise a frustoconical part having a taper identical to that of the helix of the second female threaded portion, and a cylindrical part in proximity to the intermediate sealing surface.

Preferably, the inner seal can be of the torus-to-cone type, for example with the male inner sealing surface that is tapered, while the female inner sealing surface comprises a toroid portion. Advantageously, the intermediate seal can be of a different type from the inner seal. The intermediate seal can be of the cone-to-cone type, the male and female intermediate sealing surfaces then being tapered, in particular having a substantially identical taper.

More particularly, the female inner sealing surface can comprise, in this order from the body of the second tube towards the second distal end, a first arc of circle of radius R1 and a second arc of circle of radius R2 such that these radii fulfil the following condition:

$$R1<R2 \quad [\text{Math 3}]$$

The stabbing flank and the load flank of the helix of the male threaded portion can comprise rectilinear portions, respectively connected by blending radii to the adjacent thread crest and thread root, such that the stabbing flank of the female threaded portion can comprise at least one rectilinear portion parallel to the stabbing flank of the male threaded portion, for the first threaded portion as for the second threaded portion.

The invention is also of benefit when the second distal end of the second tube can be upset, i.e. in order to obtain extra thickness. Advantageously, the two distal ends of this second tube are upset.

Alternatively and/or in combination, the second distal end of the second tube can have an outer diameter less than 103% of the outer diameter of this second tube. The connection is then called "semi-flush".

In a preferred embodiment of the invention, the male threaded portion, and respectively the female threaded portion can each comprise a single helix. In this case, the helices of the male threaded portion and respectively the female threaded portion can comprise at least 3 turns, preferably at least 4 turns. But in a variant, the first and/or the second male threaded portion can comprise several helices, these helices extending along one and the same portion of the longitudinal axis, and these helices being such that the starts of these helices can for example be equally distributed in a plane perpendicular to the longitudinal axis of the connection. The pitch of each of the helices is therefore greater than in the single-helix configurations.

In order to facilitate the assembly, the thread crests and the thread roots of the male and female threaded portions can have a taper less than the taper of said threaded portions, for example they can be parallel to the longitudinal axis of the connection. In this case, a radial height of a stabbing flank of the male threaded portion can be greater than a radial height of a load flank of this male threaded portion.

Other features and advantages of the invention will become apparent on reading the detailed description below, with reference to the attached drawings, which show.

Figure 1:
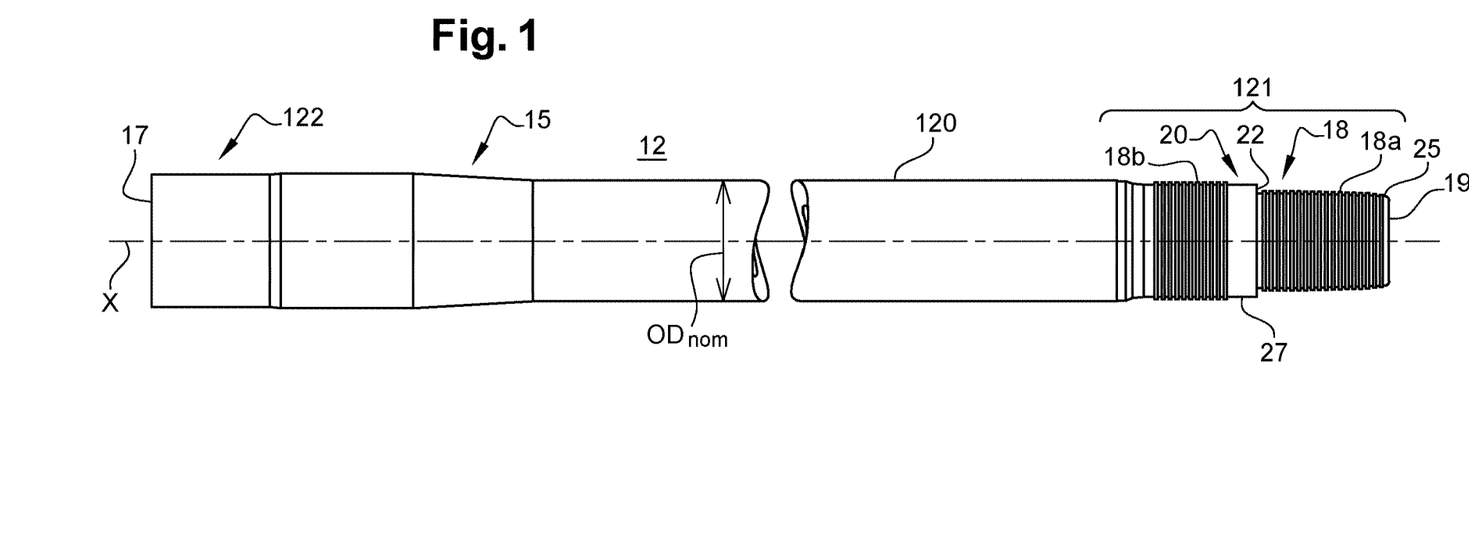
FIG. 1: an external profile view of a first tube according to the invention.

As can be seen in FIG. 1, a first tube 12 comprises a tube body 120. This first tube 12 has an axial length of several metres in length, for example of the order of 10 to 15 m in length. It extends along a longitudinal axis X. At a first axial end 121 of this first tube 12, the first tube 12 comprises a male tool joint 18. The tube body 120 comprises an outer diameter, generally denoted nominal outer diameter. Opposite the first axial end 121, the first tube comprises a second axial end 122. This second axial end 122 has an outer diameter greater than that of the tube body 120.

Figure 2:
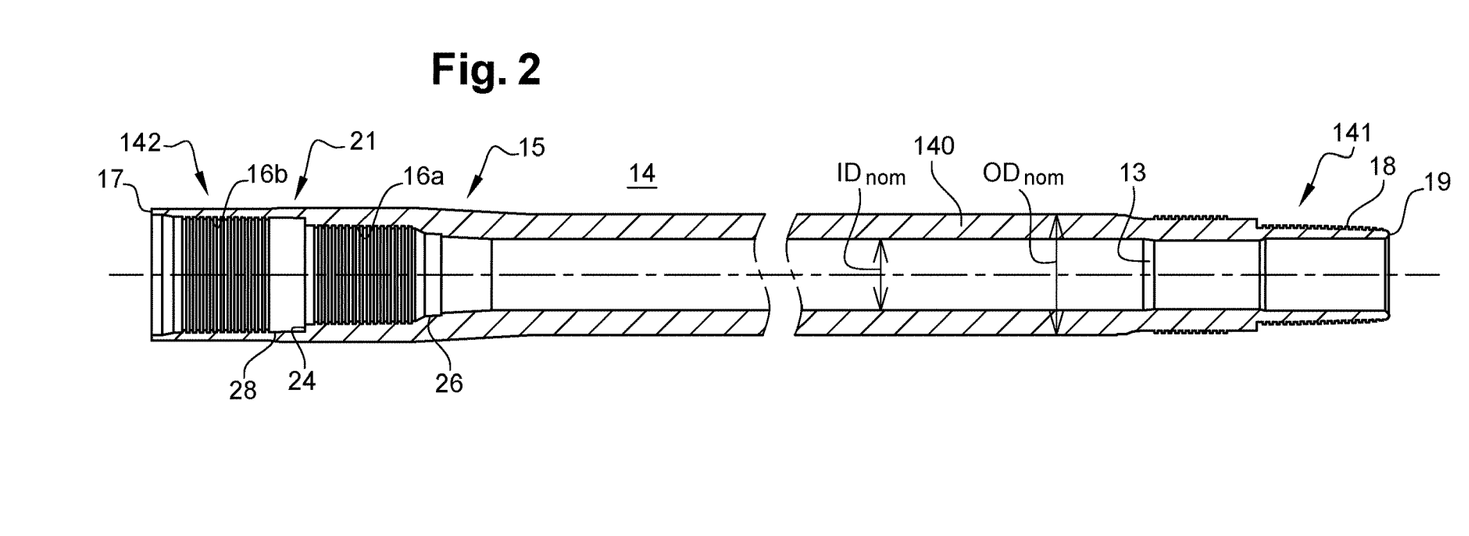
FIG. 2: a longitudinal cross-section view of a second tube according to the invention.

FIG. 2 shows a longitudinal cross-section view of a second tube 14, identical to the first tube 12. This second tube 14 comprises a tube body 140 equipped at a first axial end 141 with a male tool joint and at a second axial end 142, a female tool joint 16. The male tool joint is machined on the outer surface of the first axial end 121. The second axial end 142 has an outer diameter greater than that of the tube body 140. The female tool joint is machined on the inner surface of this second end.

Figure 5:
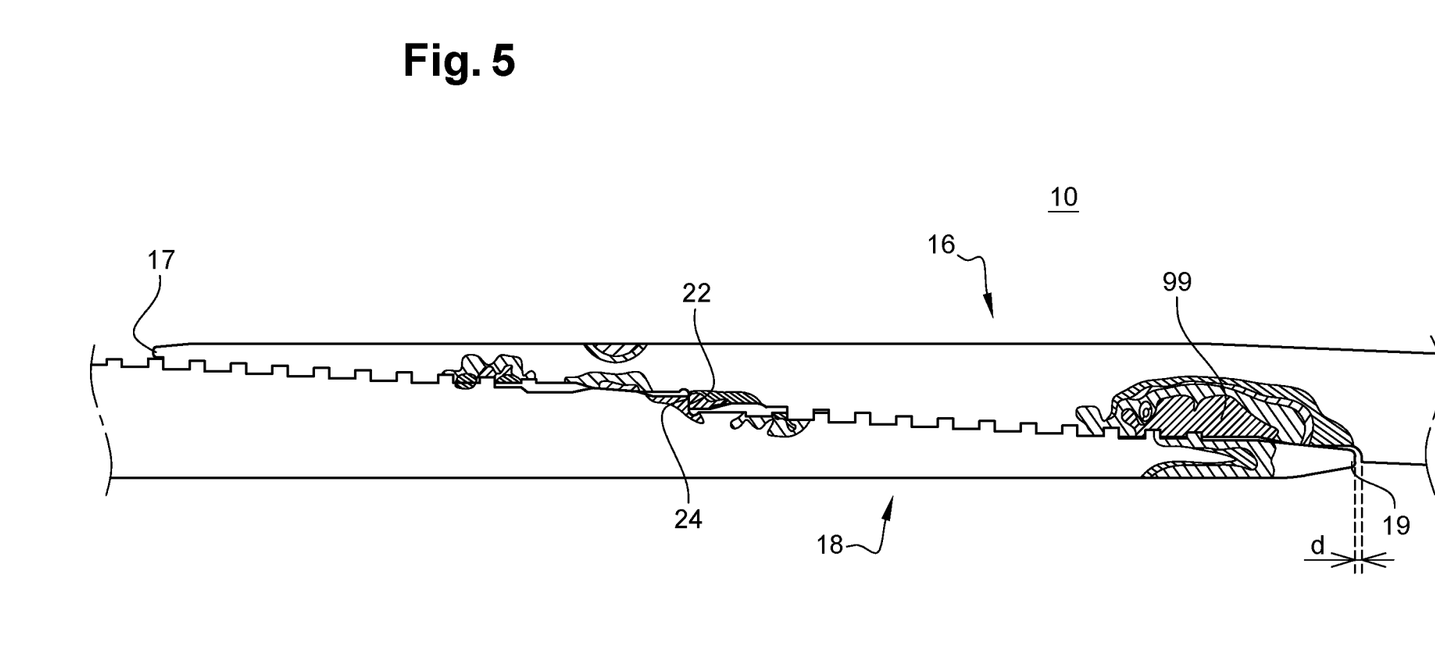
FIG. 5: a partial longitudinal cross-section view of a male tool joint of the first tube of FIG. 1 assembled to a female tool joint of the second tube of FIG. 2, this cross-section view also indicating the stress levels reached inside the connection after assembly.

A connection will be described in the description hereinafter, formed between the female tool joint 16 of the second tube 14 with the tool joint 18 of the first tube 12. For example, FIG. 5 shows a connection according to the invention. This connection is called semi-flush, insofar as the outer diameter at the level of the connection formed is less than 105% or even 103% of the outer diameter of the tube bodies 120, 140. The invention applies to connections that can be flush, namely for which the outer diameter at the level of the connection is less than 101% of the nominal outer diameter ODnom.

In the example described, the first and second tubes 12 and 14 are identical, and each comprises a male tool joint 18 at the respective first end 121 and 141 thereof, and each also comprises a female tool joint 16 at the respective second end 122 and 142 thereof.

Before machining the male tool joint 18, the first distal end 121, 141 is tapered. The tapering results in a reduction of the inner diameter of the first end 121, 141, starting from a narrowing 13 forming a transition between the tube body and the first end. Preferably, the inner diameter of the first end is restricted with respect to the nominal inner diameter of the tube body, so that after assembly of the connection, the inner diameter at the level of the connection is greater than 94% of the nominal inner diameter. The first end 121, 141 extends between a free edge 19 and the tube body. This first end bearing a male tool joint 18 represents a certain axial length, of the order of 20 to 30 cm, between the free edge 19 and the tube body.

Likewise, before machining the female tool joint 16 at the level of the second distal end 122, 142, the second end undergoes a diametral expansion. As shown in FIGS. 1 and 2, the diametral expansion 15 occurs at a distance from the free edge 17 of the second axial end 122, 142, such that the second axial end 122, 142 represents a certain axial length, of the order of 20 to 30 cm, between the free edge 17 and the tube body.

Figure 3:
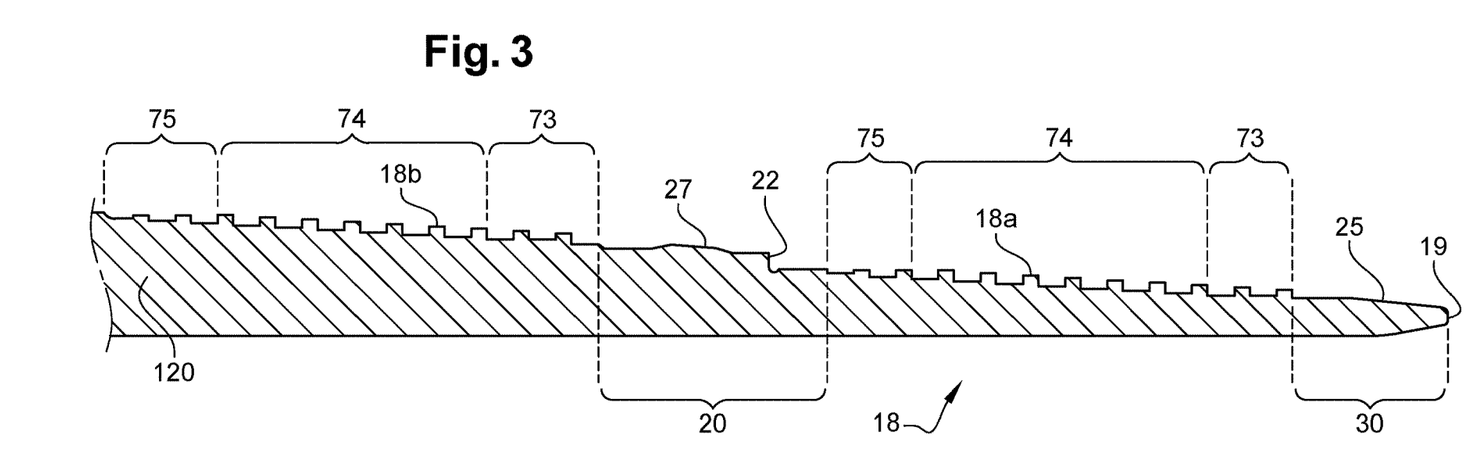
FIG. 3: a partial longitudinal cross-section view of a male tool joint of the first tube in FIG. 1.

The male tool joint 18 comprises two threaded portions, respectively 18a and 18b. These two threaded portions extend along two successive portions along the axis X. They are spaced apart from one another by a non-threaded intermediate portion 20. The male threaded portions 18a and 18b are offset radially with respect to the axis X. In fact, the male tool joint 18 comprises a male abutment shoulder 22 in the non-threaded intermediate portion 20. The male intermediate abutment 22 defines an annular surface in a plane perpendicular to the axis X. Preferably, the male threaded portions 18a and 18b each comprise a single spire forming a single helix. Preferably, the pitch of the helices of each of the threaded portions is identical.

Between the free edge 19 and the first threaded portion 18a, a male non-threaded inner portion 30 comprises an inner sealing surface 25.

Between the male intermediate abutment 22 and the second male threaded portion 18b, the male non-threaded intermediate portion 20 comprises an intermediate sealing surface 26.

Figure 4:
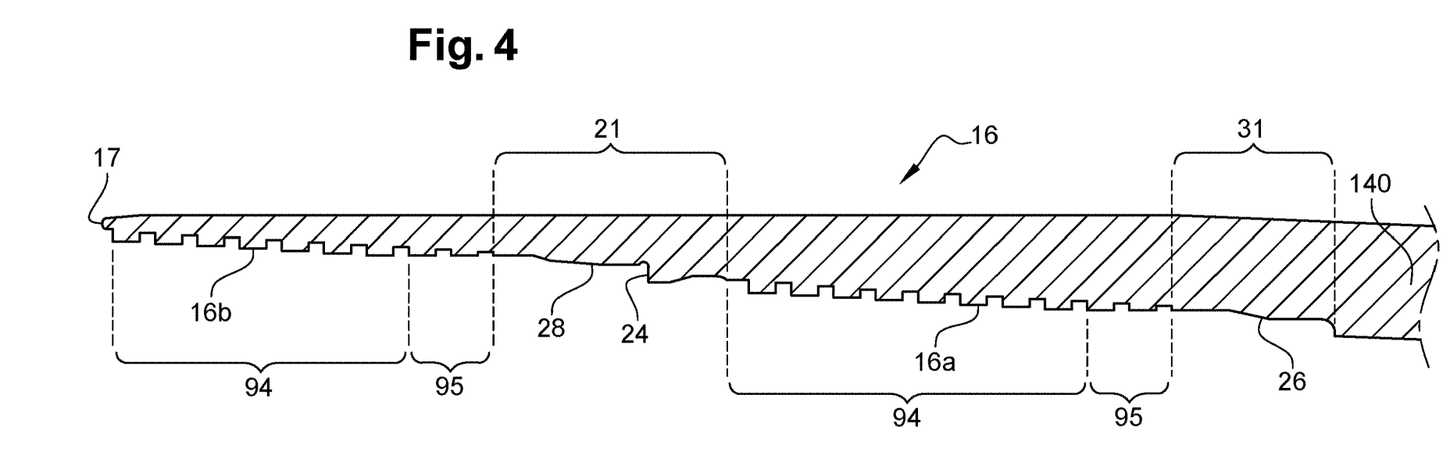
FIG. 4: a partial longitudinal cross-section view of a female tool joint of the second tube in FIG. 2.

The female tool joint 16 comprises two threaded portions, respectively 16a and 16b. These two threaded portions extend along two successive portions along the axis X. They are spaced apart from one another by a non-threaded intermediate portion 21. The female threaded portions 16a and 16b are offset radially with respect to the axis X. In fact, the female tool joint 16 comprises an intermediate abutment shoulder 24 in the non-threaded intermediate portion 21. The female intermediate abutment 24 defines an annular surface in a plane perpendicular to the axis X. Preferably, the male threaded portions 18a and 18b each comprise a single spire forming a single helix. Preferably, the pitch of the helices of each of the male and female threaded portions is identical.

Between the tube body 14 and the first threaded portion 16a, the female tool joint 16 comprises a female non-threaded inner portion 31 comprising an inner sealing surface 27.

Between the intermediate abutment surface 24 and the second female threaded portion 16b, the female non-threaded intermediate portion 21 comprises an intermediate sealing surface 29.

In the assembled position of the connection, in FIG. 5,
  the free edge 19 remains at a non-zero axial distance "d",
    for example more than 0.1 mm from the female tool joint 16;

the helix of the first male threaded portion 18a is engaged in that of the first female threaded portion 16a, the helix of the second male threaded portion 18b is engaged in that of the second female threaded portion 16b, the male intermediate abutment 22 comes into abutting contact with the female intermediate abutment 24, the male inner sealing surface 25 comes into interference contact radially with the female inner sealing surface 26 in order to form an inner metal-metal seal protecting the connection from internal pressure loading, the male intermediate sealing surface 27 comes into interference contact radially with the female intermediate sealing surface 28 in order to form an intermediate metal-metal seal protecting the connection from external pressure loading, the free edge 17 of the female tool joint is at a non-zero axial distance from the male tool joint.

The connection according to the invention comprises a single axial abutment, orthogonal to the axis X, obtained by the contact between the intermediate abutments 22 and 24, and the main function of which is to mark the end of the makeup of the connection.

A radial thickness of the surfaces in contact with these intermediate abutments 22 and 24 is less than 20% of the cross-section of the tube 120 or 140, this cross-section being delimited between ODnom and IDnom. The machining of the male and female tool joints allows a manufacturing tolerance which makes it possible to use any compliant tube the dimensions ODnom and IDnom of which are compliant with the tolerances of the specifications set in the API standards. The intermediate abutment nevertheless makes it possible to absorb a portion of the compressive stresses of the connection, but the dimensioning thereof does not make it possible to absorb all of the compressive loading.

On either side of the inner metal-metal seal, the male non-threaded inner portion 30 is at a non-zero radial distance from the female non-threaded inner portion 31. The inner metal-metal seal is produced at a distance from the edges of this inner non-threaded zone 30-31.

Except at the level of the contacts obtained for the intermediate metal-metal seal and for the abutment of the abutment shoulders 22 and 24, the male non-threaded intermediate portion 20 is at a non-zero radial distance from the female non-threaded inner portion 21. The intermediate metal-metal seal is produced at a distance from the edges of this intermediate non-threaded zone 20-21.

As can be seen in FIG. 2, the inner metal-metal seal receives more stresses than the intermediate seal. The intermediate seal is useful for ensuring the sealing under external pressure stresses. Between the second threaded portion and the intermediate abutment, the intermediate seal thus has a thickness of the male tool joint 18 and of the female tool joint 16 at the level of this sealing surface which allows it to have a high contact stability, in particular under high tensile loading: there is no detachment of the surfaces.

Figure 6:
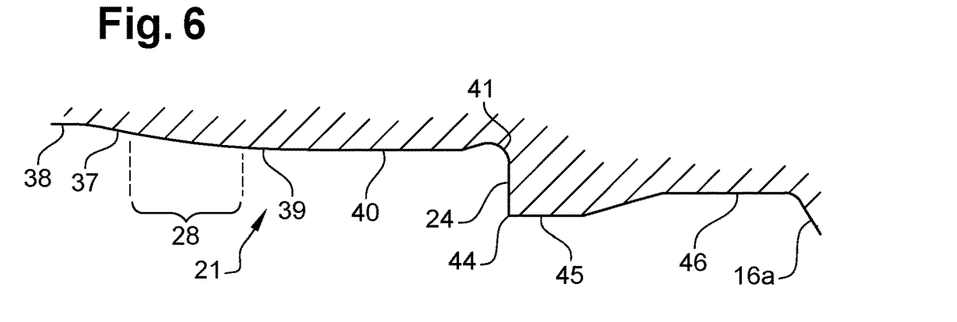
FIG. 6: a partial longitudinal cross-section view of a female non-threaded intermediate portion of a female tool joint according to the invention.
Figure 7:
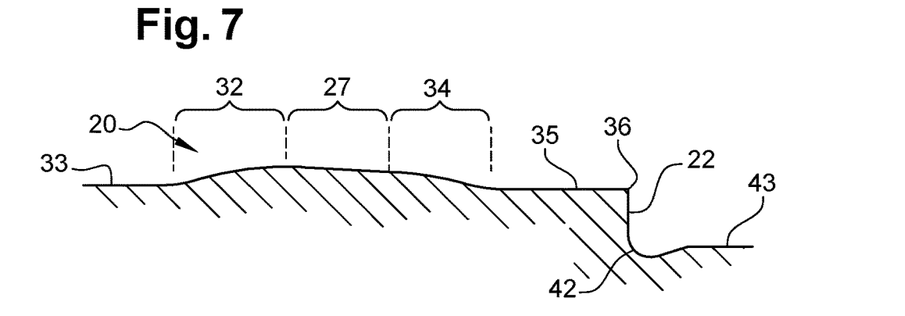
FIG. 7: a partial longitudinal cross-section view of a male non-threaded intermediate portion of a male tool joint according to the invention.

In detail, in FIGS. 6 and 7, according to an embodiment of the invention, the intermediate seal is of the cone-to-cone type. The male intermediate sealing surface 27 and the female intermediate sealing surface 28 are frustoconical having identical taper. Alternatively, these surfaces 27 and 28 can have a substantially identical taper, in the sense that the taper of one can be comprised between + and −1% of the taper of the other. For example, the taper of these surfaces 27 and 28 is comprised between 15 and 25%, for example equal to 20%+/−1%, or also both equal to 20%.

The male intermediate sealing surface 27 is connected on one side by a convexo-concave curved portion 32 to a cylindrical surface 33 which is adjacent to the second threaded portion 18b, and connected on the other side by another convexo-concave curved portion 34 to another cylindrical surface 35 adjacent to the male abutment shoulder 22. The cylindrical surface 35 is connected to the male abutment shoulder 22 by a blending radius 36. The convexo-concave curved parts 32 and 34 are arranged in such a way that they are convex on the side adjacent to the male intermediate sealing surface 27, and concave when they connect respectively to the cylindrical surfaces to which they are respectively adjacent. In practice, the convexo-concave curved parts 32 and 34 are such that the outer diameter at the level of the cylindrical surface 33 adjacent to the threaded portion 18b is greater than that of the cylindrical surface 35 adjacent to the male abutment 22.

Similarly, the female intermediate sealing surface 28 is connected on one side by a convexo-concave curved portion 37 to a cylindrical surface 38 which is adjacent to the second female threaded portion 16b, and connected on the other side by another convexo-concave curved portion 39 to another cylindrical surface 40 adjacent to the female abutment shoulder 24. The convexo-concave curved parts 37 and 39 are arranged in such a way that they are convex on the side adjacent to the female intermediate sealing surface 28, and concave when they connect respectively to the cylindrical surfaces to which they are respectively adjacent. In practice, the convexo-concave curved parts 37 and 39 are such that the inner diameter at the level of the cylindrical surface 38 adjacent to the female threaded portion 14b is greater than that of the cylindrical surface 40 adjacent to the female abutment 24.

The convexo-concave surfaces 32, 34, 37 and 39 are connected tangentially. The convexo-concave surfaces 32, 34, 37 and 39 comprise curved parts connected tangentially to one another, having a curving radius comprised between 3 and 30 mm.

More specifically, the cylindrical surface 40 is connected to the female abutment shoulder 24 by a concave transition 41. The concave transition 41 has a frustoconical part connected tangentially to a curving radius less than 1 mm, the curving radius of the concave transition 41 being tangent to the female abutment shoulder 42, in order to avoid the concentration of stresses in proximity to the female abutment shoulder 24.

In order to avoid the concentration of stresses in proximity to the male abutment shoulder 22, the male abutment shoulder is connected by a large-radius concave transition 42 to a cylindrical surface 43 adjacent to an end of the first male threaded portion 18a.

Similarly, the female abutment shoulder 24 is connected by a blending radius 44 to an adjacent cylindrical surface 45 of the first female threaded portion 16a. In practice, given the respectively male and female threaded portions are obtained by machining, the cylindrical surface 45 is adjacent to a groove 46 having a cylindrical bottom for the extraction of the tool for machining the thread of the first female threaded portion 16a. The groove having a cylindrical bottom 46 defines an inner diameter greater than the inner diameter of the cylindrical surface 45. The groove 46 comprises a frustoconical surface linking to the cylindrical surface 45.

Figure 8:
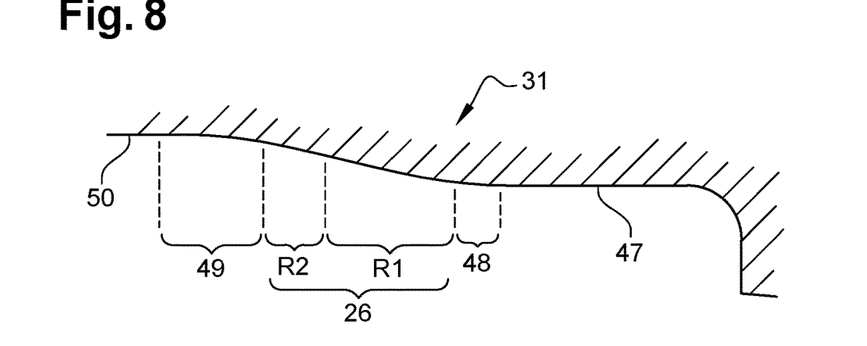
FIG. 8: a partial longitudinal cross-section view of a female non-threaded inner portion of a female tool joint according to the invention.
Figure 9:
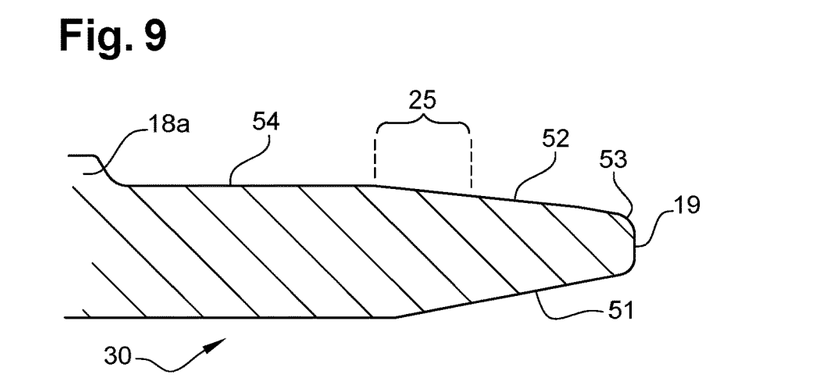
FIG. 9: a partial longitudinal cross-section view of a male non-threaded inner portion of a male tool joint according to the invention.

In detail, in FIGS. 8 and 9, according to an embodiment of the invention, the inner seal is of the torus-to-cone type. In this example, the male inner sealing surface 25 is frustoconical and the female inner sealing surface 26 is toroid.

In FIG. 8, the female inner sealing surface 26 is a curve obtained by several adjacent convex curved portions tangential to one another. In an example, it comprises two adjacent curved portions, respectively radii R1 and R2, such that the curved portion R1 is closer to the tube body 140 than the curved portion R2, and the radius R1 is less than the radius R2. Preferably, the radii R1 and R2 are greater than 30 mm. This toroid female inner sealing surface 26 is connected, on the side of the tube body 140, to a cylindrical surface 47 by a curving radius 48 having a radius at least 3 times less than the radii R1 and R2. On the opposite side, it is connected to an adjacent cylindrical surface 50 of the first female threaded portion 16a by a convexo-concave surface which is connected tangentially on the one hand to the cylindrical surface 50, and on the other hand to the sealing surface 26.

In order to come into contact with the female inner sealing surface 26, the male inner sealing surface 25 comprises a frustoconical portion having a taper comprised between 10 and 20%. At the level of the inner perimeter of the male tool joint 12, the inner surface of the male tool joint is chamfered 51, so that the inner non-threaded portion 30 has a smaller thickness, and even if the inner seal induces an internal deflection of the sealing ring defined between the inner sealing surface 25 and the free end 19, the male tool joint 18 does not substantially modify the inner passage diameter, called connection drift diameter.

The male inner sealing surface 25 is connected tangentially to a convex surface 52, having a large curving radius, which is itself connected by an interface 53 at the free edge 19 which is defined perpendicularly to the axis X. On the side opposite to the free edge 19, the male sealing surface is connected tangentially to a cylindrical surface 54 upstream of the start of the threading of the first male threaded portion 18a. This cylindrical surface 54 allows the tools for machining the thread to start.

The main radius R2 is determined in order to overcome the stress, and the plasticizing of the female tool joint 16 above the inner seal. This radius R2 is thus intended to manage the sealing for the loading where the contact pressure is very high. When the contact pressure is more moderate, the deflection of the sealing ring of the male tool joint is also more moderate, and the position of the sealing point thus moves towards the inside of the tube body 140 so that the value of the radius R2 is no longer necessary. A radius R1 less than the radius R2 is thus used for these working points. The radial thickness of the sealing surface along the axis X is such that it makes it possible to use a smaller thickness in order to machine this female inner sealing surface 26. Therefore, the machining of the female tool joint can be carried out on tubes, regardless of their outer diameter, and automatically the effectiveness of the female tool joint is increased for a given tube thickness. A curving radius 48 also makes it possible to reduce the quantity of thickness of material necessary for machining the female tool joint, and thus to increase the effectiveness of the connection for a given tube thickness.

During makeup, the first contact of the male inner sealing surface 25 is made with the radius portion R2. As this first contact can be harsh, the fact of having an increased R2 value makes it possible to limit the risk of galling. Once the contact has been established, the remainder of the makeup is completed by moving the contact between the male inner sealing surface 25 to the radius portion R1. This specific configuration of the female inner sealing surface 26 to improve the performance and the number of makeup-breakouts that the connection according to the invention can bear.

In the remainder of the description, we will now describe the threadings.

In the embodiment shown in FIGS. 1 to 9, all of the male threaded portions 18a, 18b and female threaded portions 16a and 16b respectively each comprise a single helix.

However in a variant, while remaining within the scope of the invention, a male threaded portion and its complementary threaded portion can comprise one and the same number of helices greater than 2 helices.

A helix is defined by a helical protuberance. A helix comprises a load flank, a thread crest, a stabbing flank and a thread root. The thread root, like the thread crest, is defined between a load flank and a stabbing flank, such that on a helix borne by the male tool joint 18, the thread root is radially closer to the longitudinal axis X than the thread crest;

on a helix borne by the female tool joint 16, the thread root of this helix is radially further from the longitudinal axis X than the thread crest.

A longitudinal cross-section profile of this helical protuberance is said to be substantially trapezoidal, insofar as a thread crest extends axially between the load flank and stabbing flank respectively.

Figure 10:
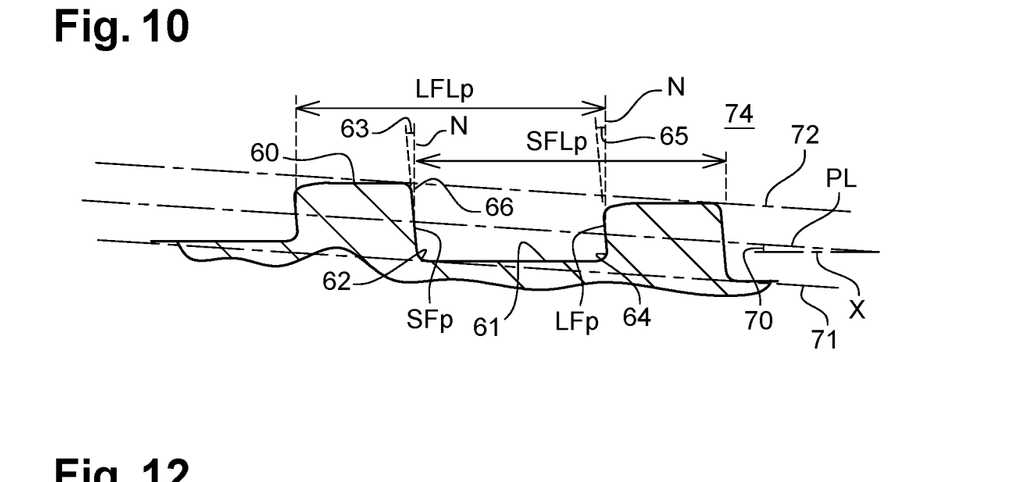
FIG. 10: a partial longitudinal cross-section view of a male threaded portion of a male tool joint according to the invention.

FIG. 10 represents a frustoconical portion 74 on two turns of the helix of the first and of the second male threaded portion 18a, respectively 18b. The structure described below for the helix is reproduced over at least several turns, over at least 3 turns, while maintaining the dimensions, shapes and proportions set out below.

The helix of the male threaded portion comprises a load flank LFp, a thread crest 60, a stabbing flank SFp and a thread root 61. The root 60 and the crest 61 form segments parallel to the longitudinal axis X. The thread root 61 is connected by a concave curved transition 62 to the stabbing flank SFp. The concave curved transition 62 is such that the thread root 61 and the stabbing flank SFp form an angle greater than 90°. The stabbing flank SFp is rectilinear, and forms an angle 63 with respect to a normal N to the longitudinal axis X. The thread root 61 is connected by a second concave curved transition 64 to the load flank LFp, at an end of the thread root 61 opposite to that by which this thread root is connected to the stabbing flank SFp. The second concave curved transition 64 is such that the thread root 61 and the load flank LFp form an angle less than 90°. The load flank LFp is rectilinear, and forms an angle 65 with respect to the normal N to the longitudinal axis X.

The angle 65 is equal to the angle 63 plus or minus machining tolerances, namely +/−0.25°. The stabbing flanks SFp are chosen parallel to the load flanks LFp so that the stabbing flanks take up a part of the load observed in the connection under certain compressive stresses.

The angle 63 is for example comprised between 1 and 5°, preferably between 1.25 and 3.75°.

Figures 11, 13:
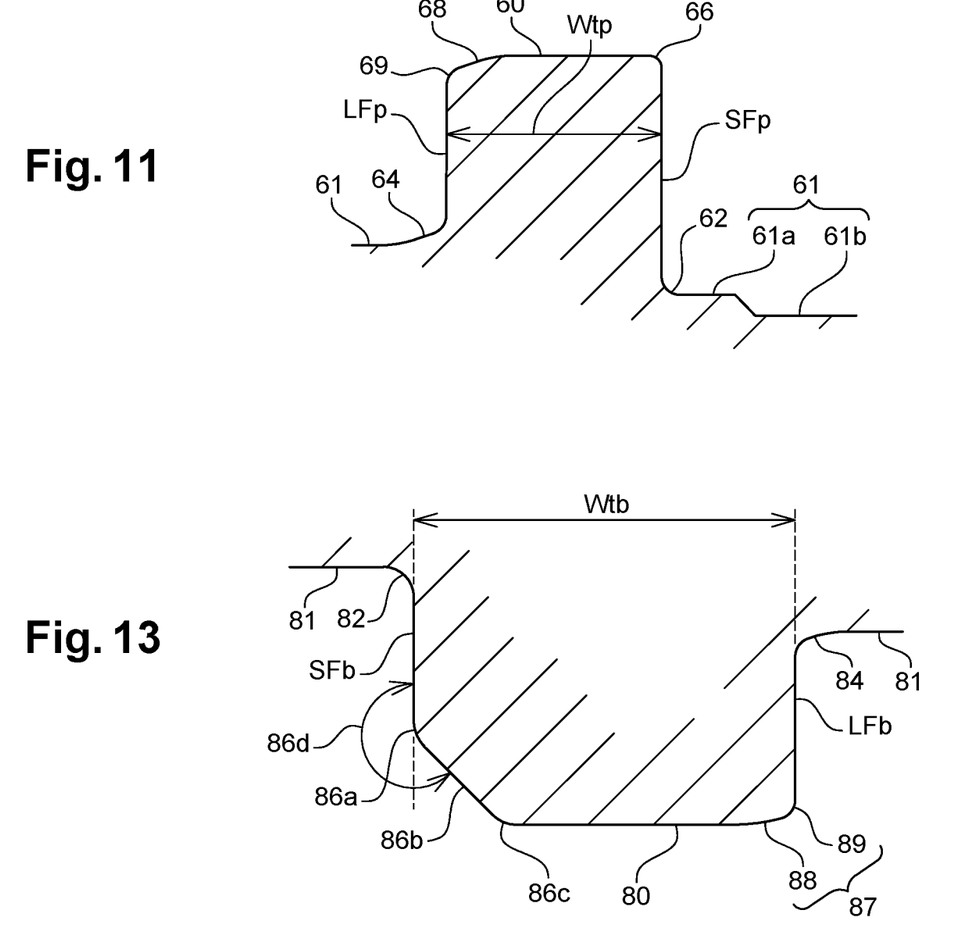
FIG. 11: a partial longitudinal cross-section view of a tooth of a male threaded portion according to FIG. 10.
FIG. 13: a partial longitudinal cross-section view of a tooth of a female threaded portion according to FIG. 12.

In more detail, in FIG. 11, the curved transition 62 is controlled in order to be able to guarantee the radial dimension of the stabbing flank SFp. However, the thread root 61 can comprise a step with two staggered cylindrical portions 61a and 61b, so that the cylindrical portion 61a immediately adjacent to the curved transition 62 is radially further from the longitudinal axis X than the cylindrical portion 61b adjacent to the load flank LFp.

The crest 60 is connected to the stabbing flank SFp by a convex curved transition 66. This crest 60 is connected to the load flank LFp by a complex convex surface 67 comprising a frustoconical portion 68 adjacent to the cylindrical portion of the crest 60, this frustoconical portion 68 being connected by a curving radius 69 to the load flank LFp.

The radial height of the stabbing flank SFp is greater than the radial height of the load flank LFp, so that the male threaded portion comprises a frustoconical portion in the direction in which a fictitious line PL (pitch line) passing through the centre of the successive stabbing flanks SFp and load flanks LFp of the helix defines a taper angle 70 with respect to the longitudinal axis X. In this frustoconical portion, the helix is defined between the surfaces of two fictitious frustoconical envelope surfaces 71 and 72 respectively parallel to the pitch line PL. The fictitious lower envelope surface 71 passes through the tangent points between the thread root 61 and the curved transition 62 adjacent to the stabbing flank SFp, of each turn of the helix in this frustoconical portion. The fictitious upper envelope surface 72 passes through a tangent point between the convex curved transition 66 adjacent to the stabbing flank SFp and the thread crest 60.

The angle 70 is such that the taper of this male threaded portion 18a and/or 18b is comprised between 5 and 15%, preferably between 8 and 12%.

The helix comprises, in addition to the frustoconical portion 74 described above, a cylindrical portion 73 at an end of the helix, this cylindrical portion 73 developing over more than one turn, and preferably less than three turns, in particular less than two turns. In the embodiment described, this end of the helix having a cylindrical shape 73 is placed on the side of the end of the male threaded portion that is closest axially to the free edge 19. In particular, the first male threaded portion 18a and the second male threaded portion 18b each comprise such a cylindrical portion 73 adjacent to the frustoconical portion 74 of the helix.

The cylindrical portion 73 of the helix is such that the successive roots 61 of this cylindrical portion are parallel and collinear to one another. The fictitious lower envelope surface 71 becomes parallel to the axis X in this cylindrical portion, while the fictitious upper envelope surface 72 maintains the same taper for the frustoconical part 74 and the cylindrical part 73.

The helix of the male threaded portion comprises in addition an imperfect portion 75 at an opposite end of the male threaded portion, namely at an end of the helix that is furthest axially from the free edge 19. In particular, the first male threaded portion 18a and the second female threaded portion 18b each comprise such an imperfect portion 75 adjacent to the frustoconical portion 74, the frustoconical portion 74 being flanked between the imperfect portion 75 and the cylindrical portion 73. This imperfect portion 75 is such that the threads are of smaller heights, and the successive crests 60 of this imperfect portion 75 are parallel and collinear to one another. The fictitious upper envelope surface 72 becomes parallel to the axis X in this imperfect portion 75. This imperfect portion 75 develops over more than one turn, and preferably less than three turns, in particular less than two turns. In the imperfect portion 75, the fictitious lower envelope surface 71 has a taper identical to that observed in the frustoconical portion 74.

The existence of the cylindrical portion 73 makes it possible to limit the radial bulk of the male threaded portion in the thickness of the wall where the male tool joint is formed. Consequently, a greater minimal thickness can be guaranteed at the level of the respectively inner 25 and intermediate 27 male sealing surfaces. The sealing performance is improved by this configuration of the male threaded portion.

In addition, the presence of the cylindrical portion 73 adjacent to the frustoconical portion 74 makes it possible to avoid any sudden variation in the stiffness of the male non-threaded inner portion 30. This configuration makes it possible to avoid an early plastification of the zones of the connection receiving a maximum of stresses.

The helix of the male threaded portion is such that a pitch of the stabbing flank SFLp is constant in the frustoconical portion 74, and also constant in the imperfect portion 75. The pitch is in particular the same in the frustoconical 74 and imperfect 75 portions. A pitch of the stabbing flank LFLp is the same in the frustoconical 74 and imperfect 75 portions, this pitch LFLp also being equal to the pitch of the stabbing flank SFLp.

The pitch of the stabbing flank SFLp1 and the pitch of the load flank LFLp1 are equal to a constant k1 for the first male threaded portion 18a. Similarly, for the second male threaded portion 18b, the pitch of the stabbing flank SFLp2 and the pitch of the load flank LFLp2 are equal to this same constant k1. According to the invention, this constant k1 is for example comprised between 5 and 20 mm, preferably between 6 and 8 mm.

Preferably, a tooth width Wtp of the male threaded portion, defined as a measurement along the longitudinal axis X, of the distance between the stabbing flank SFp and the load flank LFp, at the points of intersection with the pitch line PL, is such that this tooth has a width less than half of the constant k1, in particular less than 40% of the value k1.

Figure 12:
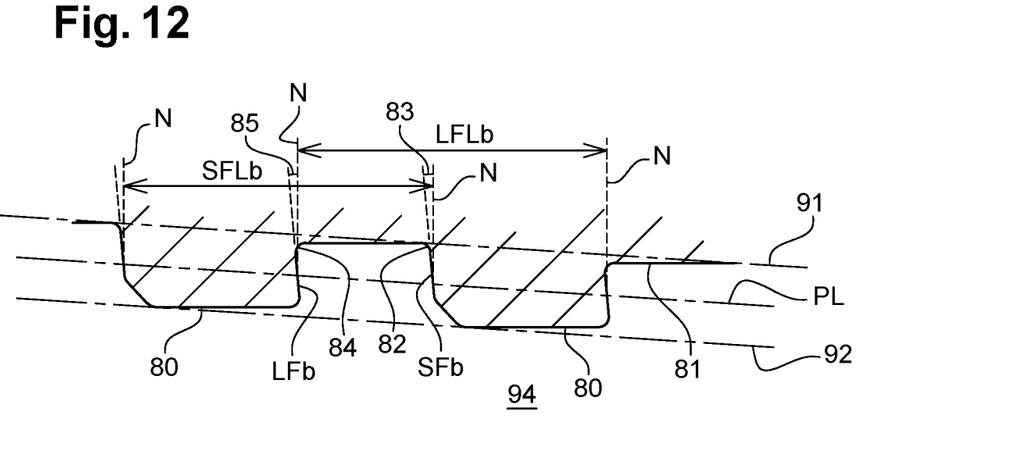
FIG. 12: a partial longitudinal cross-section view of a female threaded portion of a female tool joint according to the invention.

FIG. 12 shows a frustoconical portion 94 over two turns of the helix of the first and the second female threaded portion 16a, respectively 16b. The structure described below for the helix is reproduced over at least several turns, over at least 3 turns, while maintaining the dimensions, shapes and proportions set out below.

The helix of the female threaded portion comprises a load flank LFb, a thread crest 80, a stabbing flank SFb and a thread root 81. The root 80 and the crest 81 form segments parallel to the longitudinal axis X. The thread root 81 is connected by a concave curved transition 82 to the stabbing flank SFb. The concave curved transition 82 is such that the thread root 81 and the stabbing flank SFb form an angle greater than 90°. In an identical manner to that at the level of the male thread root 61, the thread root 81 can comprise a step with two staggered cylindrical portions 81a and 81b, so that the cylindrical portion 81a immediately adjacent to the concave curved transition 82 is radially closer to the longitudinal axis X than the cylindrical portion 81b of this root 81 which is adjacent to the load flank LFp.

The stabbing flank SFp is rectilinear, and forms an angle 83 with respect to a normal N to the longitudinal axis X. The thread root 81 is connected by a second concave curved transition 84 to the load flank LFb, at an end of the thread root 81 opposite to that by which this thread root is connected to the stabbing flank SFb. The second concave curved transition 84 is such that the thread root 81 and the load flank LFb form an angle less than 90°. The load flank LFb is rectilinear, and forms an angle 85 with respect to the normal N to the longitudinal axis X.

The angle 85 is equal to the angle 83 plus or minus machining tolerances, namely +/−0.25°.

The angle 85 is equal to the angle 65 plus or minus machining tolerances, namely +/−0.25°.

The angle 83 is equal to the angle 63 plus or minus machining tolerances, namely +/−0.25°.

The angle 83 is for example comprised between 1 and 5°, preferably between 1.25 and 3.75°.

In more detail in FIG. 13, the crest 80 is connected to the stabbing flank SFb by a convex curved transition 86. The curved transition 86 comprises a tangential blending radius 86a with the stabbing flank SFb, a tangential blending radius 86c with the crest 80, and a frustoconical surface 86b tangentially connected on either side to the tangential connections 86a and 86c. The frustoconical surface 86b forms an obtuse angle 86d, for example an open angle comprised between 190° and 240°, preferably of the order of 225° with respect to the stabbing flank SFb. The frustoconical surface 86b forms a chamfer facilitating the insertion of the male tool joint into the female tool joint. This frustoconical surface 86b reduces the axial width of the crest 80 so that an additional volume is defined between this frustoconical surface 86b and the complementary profile of the male threaded portion, this volume also making it possible to contribute to the reduction in the pressure of grease in the threading.

This crest 80 is connected to the load flank LFb by a complex convex surface 87 comprising a frustoconical portion 88 adjacent to the cylindrical portion of the crest 80, this frustoconical portion 88 being connected by a curving radius 89 to the load flank LFb.

The radial height of the load flank LFb is greater than the radial height of the stabbing flank SFb, so that the female threaded portion comprises a frustoconical portion in the direction in which a fictitious line PL (pitch line) passing through the centre of the successive stabbing flanks SFb and load flanks LFb of the helix defines a taper angle 90 with respect to the longitudinal axis X.

Figure 14:
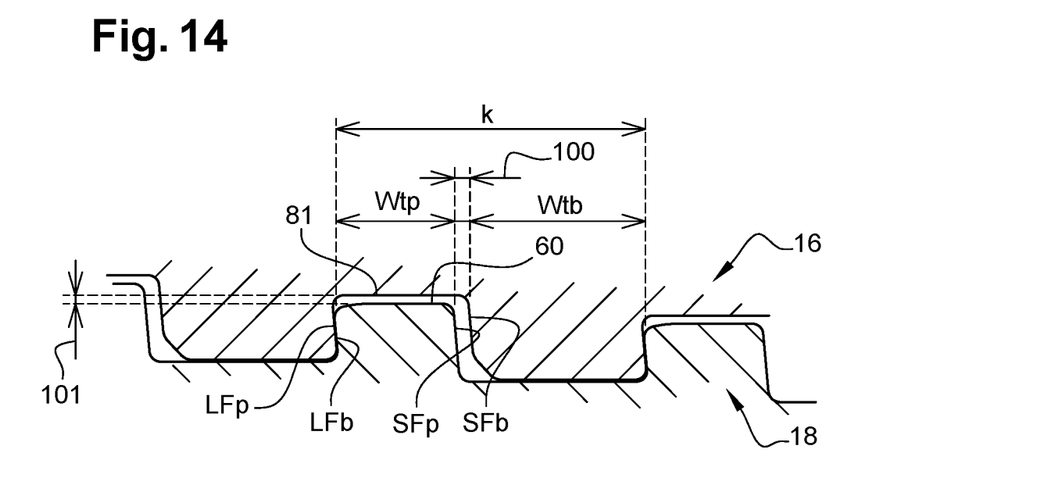
FIG. 14: a partial longitudinal cross-section view of the male threaded portion in FIG. 10 in an assembled position with the female threaded portion in FIG. 12.

The taper of this fictitious line is the same as that defined by the frustoconical portion 75 of the male threaded portion, these lines PL being superimposed in the assembled position of the connection as can be seen in FIG. 14.

In this frustoconical portion 94 of the female threaded portion, the helix is defined between the surfaces of two fictitious frustoconical envelope surfaces 91 and 92 respectively parallel to the pitch line PL. The fictitious upper envelope surface 91 passes through the tangent points between the thread root 81 and the curved transition 82 adjacent to the stabbing flank SFb, of each turn of the helix in this frustoconical portion 94. The fictitious upper envelope surface 92 passes through a tangent point between the convex curved transition 86 adjacent to the stabbing flank SFb and the thread crest 80.

The angle 90 is such that the taper of this female threaded portion 16a and/or 16b is comprised between 5 and 15%, preferably between 8 and 12%.

The helix comprises, in addition to the frustoconical portion 94 described above, an imperfect portion at an end of the helix, this imperfect portion 95 developing over more than one turn, and preferably less than three turns, in particular less than two turns. In the embodiment described, this end of the helix is placed on the side of the end of the female threaded portion that is furthest axially from the free edge 17 of the female tool joint. In particular, the first female threaded portion 16a and the second female threaded portion 16b each comprise such an imperfect portion 95 adjacent to the frustoconical portion 94 of the helix.

The imperfect portion 95 is such that the threads are of smaller heights, and the successive crests 80 of this imperfect portion 95 are parallel and collinear to one another. The fictitious lower envelope surface 92 becomes parallel to the axis X in this imperfect portion 95. In the imperfect portion 95, the fictitious upper envelope surface 91 has a taper identical to that observed in the frustoconical portion 94.

In the assembled position of the male tool joint with the female tool joint, the imperfect portion 95 of a female threaded portion is engaged with the cylindrical portion 73 of the corresponding male threaded portion.

In the embodiment according to the invention, the frustoconical portion 94 of the female threaded portion comprises more spires than the frustoconical portion 74 of the male threaded portion. In fact, the imperfect portion 75 of the male threaded portion is engaged in the frustoconical portion of the female threaded portion in the assembled position of the connection.

In particular, the male threaded portion 18a can comprise more spires than the second male threaded portion 18b.

In particular, the first female threaded portion 16a can comprise more spires than the second female threaded portion 16b.

In particular, the frustoconical portion 74 of the first male threaded portion 18a can comprise more spires than the frustoconical portion 74 of the second male threaded portion 18b.

In particular, the frustoconical portion 94 of the first female threaded portion 16a can comprise more spires than the frustoconical portion 94 of the second female threaded portion 16b.

The helix of the female threaded portion is such that a pitch of the stabbing flank SFLb is constant in the frustoconical portion 94, and also constant in the imperfect portion 95. The pitch is in particular the same in the frustoconical 94 and imperfect 95 portions. A pitch of the stabbing flank LFLb is the same in the frustoconical 94 and imperfect 95 portions, this pitch LFLb also being equal to the pitch of the stabbing flank SFLb.

The pitch of the stabbing flank SFLb1 and the pitch of the load flank LFLb1 are equal to the constant k2 for the first female threaded portion 16a. Similarly, for the second female threaded portion 16b, the pitch of the stabbing flank SFLb2 and the pitch of the load flank LFLb2 are equal to this same constant k2.

According to the invention, the constants k1 and k2 are equal to one another, and they can also be denoted under the constant term k. Given the machining tolerances, within the meaning of the invention k1 is equal to k2+/−0.05 mm.

Preferably, a tooth width Wtb of the female threaded portion, defined as a measurement along the longitudinal axis X, of the distance between the stabbing flank SFb and the load flank LFb, at the points of intersection with the pitch line PL, is such that this tooth has a width greater than the width of the tooth Wtp of the frustoconical portion 74 of the male threaded portion.

In practice, according to the invention, and in the example shown, the importance of defining the teeth of the male threaded portions having a width less than the teeth of the female threaded portions. For example, in the embodiment shown, $$50\% < \frac{Wtp}{Wtb} < 80\% \qquad \text{[Math 4]}$$

$$\text{And } Wtp + Wtb < k \qquad \text{[Math 5]}$$

Preferably, $$55\% < \frac{Wtp}{Wt} < 75\% \qquad \text{[Math 6]}$$

Or even $$67\% < \frac{Wtp}{Wtb} < 73\% \qquad \text{[Math 7]}$$

As the teeth of the female threaded portion are larger than the teeth of the male threaded portion, the female teeth thus have less of a tendency to plasticize. Now in a connection according to the invention, the stresses are seen more clearly in a zone 99 extending between the first teeth engaged on the side of the inner sealing surfaces 25 and 26, and said sealing surfaces (see FIG. 5).

Maximum shear lines which can be modelled in a connection according to the invention under compressive loading are shown at 45° with respect to the crest 60, on the side where this crest is connected to the stabbing flank SFp. And conversely, maximum shear lines which can be modelled in a connection according to the invention under tensile loading are shown at 45° with respect to the crest 60, on the side where this crest is connected to the load flank LFp. The intersection between these modelled shear lines makes it possible to define a triangle of the maximum stresses above each crest of the male threaded portion. These triangles localize the zones where the risks of plasticizing inside the female tool joint are maximum. The inventors have discovered that in order to maintain the effectiveness of the connection, it is essential to limit the height of these triangles, thus to choose a ratio as claimed in order to limit the plasticizing in the female tool joint which has a restricted thickness due to the integral connection design.

In the assembled position, as shown in FIG. 14, the load flanks LFp and LFb are in contact, an axial play 100 is maintained between the stabbing flanks SFp and SFb. Similarly, a radial play 101 is maintained between the crests 60 of the male threaded portion and the roots 81 of the female threaded portion, while the fictitious lines 71 and 91 are superimposed insofar as the crest 80 of the female threaded portion comes into contact with the thread root 61 of the male threaded portion.

The radial play 101 also makes it possible to limit the dimensioning of the zones of maximum stresses in the female tool joint.

For example, the plays 100 and 101 are comprised between 0.1 mm and 0.5 mm, preferably between 0.2 and 0.3 mm. With such an axial play, the tooth widths fulfil the condition below:

$$Wtp+Wtb < k-0.1 \text{ mm} \qquad \text{[Math 8]}$$

Figure 15:
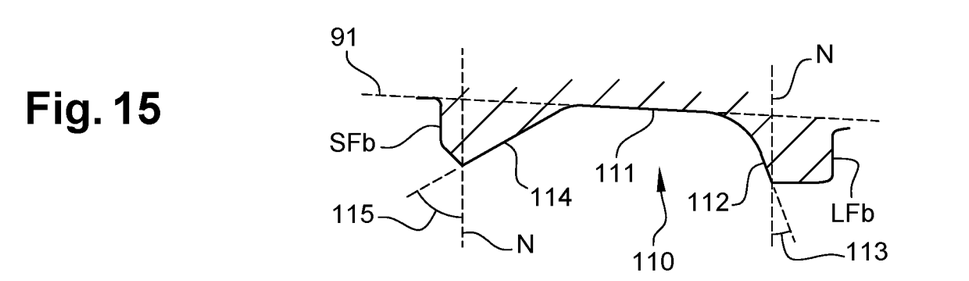
FIG. 15: a partial longitudinal cross-section view of a groove for evacuating the excess pressure of grease formed in a female threaded portion of a female tool joint according to the invention.

As the male threaded portion is cylindrical-conical, little free volume remains between the helices of the assembled male and female threaded portions. When the connection according to the invention is used with application of a makeup grease applied on the male and female tool joint before the assembly thereof, there is little space available in order to avoid the increase in pressure of the grease inside the connection. According to the invention, in the female threaded portion, and in particular in the first female threaded portion 16a an annular groove 110 is provided in order to make it possible to receive the excess grease which flows back. The benefit of this groove is to allow the grease to accumulate locally during the makeup or during the use of the connection under certain temperature and pressure conditions. This annular groove is provided in the female threaded portion which is arranged between two sealing surfaces.

In the embodiment shown, without a seal between the free edge 17 of the female tool joint and the second female threaded portion, an annular groove is not provided in the second female threaded portion.

In FIG. 15, the annular groove 110 is defined between the fictitious inner 92 and outer 91 lines. For example, the annular groove 110 has an axial width G of the order of the constant k. The groove 110 comprises a frustoconical root 111, having a taper identical to that of the female threaded portion. The annular groove is asymmetrical. On one side of the root 111, on the side of the inner sealing surface 26, the root 111 is connected to a rectilinear part 112 which has an angle 113 with the normal N comprised between 10 and 30°. On an opposite side of the root 111, on the side of the intermediate sealing surface 28, the root 111 is connected to another rectilinear part 114 which has an angle 115 with the normal N comprised between 30 and 85°.

This groove makes it possible for the grease to degas without creating a temporary loss of the seal, or risking local plasticizing of the connection, while the connection is placed at a very great depth and subjected to temperatures of the order of 180° C.

The invention claimed is:

1. A threaded tubular connection for the drilling and/or exploitation of hydrocarbon wells, comprising a first tube equipped at a first distal end with a male tool joint and a second tube equipped at a second distal end with a female tool joint, the male tool joint being capable of being assembled by makeup with the female tool joint, the first tube assembled to the second tube together defining a longitudinal axis, the male tool joint comprising, in this order from a free edge of the first distal end towards a body of this first tube: a male inner sealing surface, a first male threaded portion, a male abutment shoulder, a male intermediate sealing surface, and a second male threaded portion, the female tool joint comprising a female inner sealing surface intended to form an inner seal by radial interference with the first male sealing surface, a first female threaded portion engaged with the first male threaded portion, a female abutment shoulder in abutting contact with the male abutment shoulder, a female intermediate sealing surface intended to form an intermediate seal by radial interference with the male intermediate sealing surface, and a second female threaded portion engaged with the second male threaded portion, when the connection is assembled, the free edge of the first distal end being at a non-zero axial distance from the female tool joint in the assembled position, the male threaded portions each comprising at least one helix equipped with a load flank, a thread crest, a stabbing flank, a thread root, such that a pitch of the load flank LFLp1 and a pitch of the stabbing flank SFLp1 of the first male threaded portion, and respectively a pitch of the load flank LFLp2 and a pitch of the stabbing flank SFLp2 of the second male threaded portion fulfil the following condition:

$$SFLp1=LFLp1=SFLp2=LFLp2=k1 \qquad \text{[Math 9]}$$

where k1 is a constant for at least two complete turns of each of the helices, wherein the helix of the first female threaded portion is frustoconical having a frustoconical surface, wherein the frustoconical surface forms an obtuse angle comprised between 190° and 240° with respect to a stabbing flank of the first female threaded portion, and wherein the thread root includes a step with first and second staggered cylindrical portions, the first cylindrical portion positioned immediately adjacent a curved transition between the thread root and the stabbing flank is positioned radially further from the longitudinal axis than the second cylindrical portion is positioned from the longitudinal axis.

2. The threaded tubular connection according to claim 1, wherein the female threaded portions each comprise at least one helix equipped with a load flank, a thread crest, the stabbing flank, a thread root, such that a pitch of the load flank LFLb1 and a pitch of the stabbing flank SFLb1 of the first male threaded portion, and respectively a pitch of the load flank LFLb2 and a pitch of the stabbing flank SFLb2 of the second male threaded portion fulfil the following condition:

$$SFLb1 = LFLb1 = SFLb2 = LFLb2 = k2 \qquad \text{[Math 10]}$$

where k2 is a constant for at least two complete turns of each of the helices.

3. The threaded tubular connection according to claim 2, wherein the constants k1 and k2 are equal.

4. The threaded tubular connection according to claim 2, wherein the first threaded zone of the female tool joint comprises an annular groove.

5. The threaded tubular connection according to claim 2, wherein the helix of the first female threaded portion has a taper comprised between 5% and 15%, preferably 8% and 12%.

6. The threaded tubular connection according to claim 5, wherein the helix of the first male threaded portion comprises a frustoconical part having a taper identical to that of the helix of the first female threaded portion, and a cylindrical part in proximity to the inner sealing surface.

7. The threaded tubular connection according to claim 2, wherein the helix of the second female threaded portion is frustoconical, preferably exclusively frustoconical, for example having a taper comprised between 5% and 15%, preferentially 8% and 12%.

8. The threaded tubular connection according to claim 7, wherein the helix of the second male threaded portion comprises a frustoconical part having a taper identical to that of the helix of the second female threaded portion, and a cylindrical part in proximity to the intermediate sealing surface.

9. The threaded tubular connection according to claim 1, wherein the inner seal is of the torus-to-cone type, the male inner sealing surface being tapered while the female inner sealing surface comprises a toroid portion.

10. The threaded tubular connection according to claim 1, wherein the intermediate seal is of the cone-to-cone type, the male and female intermediate sealing surfaces being tapered, in particular having a substantially identical taper.

11. The threaded tubular connection according to claim 1, wherein the female inner sealing surface comprises, in this order from the body of the second tube towards the second distal end, a first arc of circle of radius R1 and a second arc of circle of radius R2 such that these radii fulfil the following condition:

$$R1 < R2. \qquad \text{[Math 11]}$$

12. The threaded tubular connection according to claim 1, wherein the stabbing flank and the load flank of the helix of the male threaded portion are respectively rectilinear, and respectively connected by blending radii to the adjacent thread crest and thread root, the stabbing flank of the female threaded portion comprising at least one rectilinear portion parallel to the stabbing flank of the male threaded portion, for the first threaded portion as for the second threaded portion.

13. The threaded tubular connection according to claim 1, wherein the second distal end of the second tube is upset, i.e. in order to obtain extra thickness.

14. The threaded tubular connection according to claim 1, wherein the second distal end of the second tube has an outer diameter less than 103% of the outer diameter of this second tube.

15. The threaded tubular connection according to claim 1, wherein the first and/or the second male threaded portion can comprise several helices, such that these helices extend along one and the same portion of the longitudinal axis, and these helices are such that the starts of these helices can be equally distributed in a plane perpendicular to the longitudinal axis of the connection.

* * * * *